United States Patent
Kell et al.

(10) Patent No.: US 9,347,855 B2
(45) Date of Patent: May 24, 2016

(54) INSPECTION ARRANGEMENT

(71) Applicant: ROLLS-ROYCE PLC, London (GB)

(72) Inventors: James Kell, Nottingham (GB); Thomas Frederick Danvers, Wirksworth (GB); Mark Richard Chetwyn, Derby (GB)

(73) Assignee: ROLLS-ROYCE plc, London (GB)

( * ) Notice: Subject to any disclaimer, the term of this patent is extended or adjusted under 35 U.S.C. 154(b) by 417 days.

(21) Appl. No.: 14/054,237

(22) Filed: Oct. 15, 2013

(65) Prior Publication Data

US 2014/0130583 A1 May 15, 2014

(30) Foreign Application Priority Data

Nov. 15, 2012 (GB) .................................. 1220543.1

(51) Int. Cl.
*G01M 15/14* (2006.01)
*F01D 21/00* (2006.01)

(52) U.S. Cl.
CPC ............. *G01M 15/14* (2013.01); *F01D 21/003* (2013.01); *F05D 2260/80* (2013.01)

(58) Field of Classification Search
None
See application file for complete search history.

(56) References Cited

U.S. PATENT DOCUMENTS

| | | | |
|---|---|---|---|
| 3,593,122 A * | 7/1971 | Barton et al. | 324/220 |
| 4,037,465 A * | 7/1977 | Cook et al. | 73/588 |
| 4,207,872 A | 6/1980 | Meiri et al. | |
| 4,709,719 A * | 12/1987 | Littleton | F16L 55/46 137/268 |
| 4,907,314 A * | 3/1990 | Kershaw | 15/104.061 |
| 5,195,392 A * | 3/1993 | Moore et al. | 73/866.5 |
| 6,431,079 B1 * | 8/2002 | Appleton et al. | 104/138.2 |
| 6,793,399 B1 * | 9/2004 | Nguyen | 385/53 |
| 2005/0126316 A1 * | 6/2005 | Richter et al. | 73/866.5 |
| 2007/0051192 A1 * | 3/2007 | Penza et al. | 73/865.8 |
| 2009/0013806 A1 * | 1/2009 | Miller et al. | 73/865.8 |
| 2010/0305875 A1 * | 12/2010 | Williams | G01B 21/14 702/35 |
| 2011/0009696 A1 | 1/2011 | Miyoshi | |

FOREIGN PATENT DOCUMENTS

| | | |
|---|---|---|
| EP | 1782726 A2 | 5/2007 |
| EP | 2 119 875 A2 | 11/2009 |
| GB | 2478081 A | 8/2011 |
| WO | 2011126812 A1 | 10/2011 |

OTHER PUBLICATIONS

Mar. 6, 2015 Examination Report in Great Britain Patent Application No. GB1220543.1.
Feb. 14, 2013 British Search Report issued in British Application No. GB1220543.1.

* cited by examiner

*Primary Examiner* — Robert R Raevis
(74) *Attorney, Agent, or Firm* — Oliff PLC

(57) ABSTRACT

An inspection arrangement including an inspection element and a positioning tool for positioning the inspection element, the inspection element being attachable to the positioning tool by an attachment arrangement, and having a fixing element to present the inspection element in use, the fixing element including a plurality of radially extending resilient elements.

12 Claims, 4 Drawing Sheets

INSPECTION ARRANGEMENT

FIELD OF THE INVENTION

The present invention relates to inspection arrangements and more particularly to inspection arrangements for inspection internal components of gas turbine engines.

BACKGROUND TO THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

In order to improve design as well as confirm performance it is advantageous to inspect parts of a gas turbine engine during operation. It is known to use such techniques as boroscoping which acts in a similar manner to an endoscope and so allows images to be obtained. Generally such inspection tools include a flexible or rigid shaft which is inserted into an engine or through a suitable inspection port. Observations are then made remotely either directly by looking down a scope into an inspection volume or indirectly by attaching a camera onto the exposed end of the endoscope and observing the image on a TV camera. It will also be understood alternatively a camera can be placed at the distal end of the scope and steered into a viewable position by appropriate manipulation of the associated flexible or rigid shaft in such circumstances acting as a positioning tool. It will also be understood that such areas may be dark or inappropriately lighted and in such circumstances a lighting element will also be provided at the distal or steerable end of the scope.

Unfortunately use of scopes has limitations in terms of their action. It will be understood that steering the distal end through which images are viewed either directly or indirectly requires manipulation of the scope. It is difficult to steer a scope with an overall length of action which is greater than approximately five meters. These difficulties are due to:

a) Steering of the scope is via a near point hand piece which will act conveniently over a large distance, such as two to five meters. The weight of the end manipulated becomes effectively greater and so handling becomes progressively more difficult;

b) There is a problem of fouling, trapping, catching or dragging of the scope sheath as it progresses to a desired observation point;

c) It will be understood that the sheath of the scope may fall into voids and in such circumstances the scope may become stuck;

d) Obstacles in the path to a desired observation point may require steering with relatively severe curvatures in the scope sheath which again can cause seizing of the probe in use;

e) Generally there are a limited number of access points into an engine and in such circumstances it is quite common to need to have an abrupt change in direction of the scope in order to gain access to the desired observation point again creating severe difficulties with regard to jamming of the probe. One component which has been found to be particularly difficult to access using conventional arrangements is the $6^{th}$ stage of the high pressure compressor 14 (HP6). This is particularly problematic, as the HP6 may need to be regularly inspected.

In view of the above it is generally difficult to place a scope with its distal end at a desired observation area. Furthermore even with highly skilled operators it can be difficult to avoid problems particularly as situations may occur that are highly stressful in terms of personal performance such as with regard to an onsite inspection of a failing engine. As indicated a particular problem is seizure of the scope within the engine which may require costly and time consuming dis-assembly of the engine to remove the inspection tool. These problems can be further exacerbated as the engine may be observed in operation and therefore will go through thermal and mechanical cycling leading to tolerance clearance changes along the path of the scope and so possible problems with respect to seizure being exacerbated.

One known solution is to attach an inspection tool to a rotatable component of the gas turbine engine using a positioning tool, releasing the camera from the positioning tool, rotating the rotatable component and wirelessly relaying images to the operator. Such a solution is described in applicant's previous patent application, European patent specification EP2119875 (the contents of which are hereby included by reference).

However, once released, the position and orientation of the inspection tool must be maintained in order to ensure that the correct observation area is inspected, and that the inspection tool can be retrieved following the inspection. In some cases, the inspection tool may have to deployed in different areas, having different internal dimensions. It is also desirable that the inspection tool can be deployed and recovered without requiring further control wires and/or power to be supplied through the inspection port.

The present invention describes an inspection arrangement and a method of inspecting a gas turbine engine which seeks to overcome some or all of the above problems.

SUMMARY OF THE INVENTION

According to a first aspect of the present invention, there is provided an inspection arrangement comprising an inspection element and a positioning tool for positioning the inspection element, the inspection element being attachable to the positioning tool by an attachment arrangement, and having a fixing element to present the inspection element in use, the fixing element comprising a plurality of radially extending resilient elements.

Advantageously, the invention provides an inspection arrangement comprising an inspection element which can be positioned by pushing the inspection element to an observation area, and then automatically maintained in the presented position until the inspection element is retracted by the user. The inspection arrangement can be used in observation areas having different sized cavities, and does not require external actuation to deploy or retract the resilient elements to maintain the inspection element in position once deployed.

Each of the radially extending resilient elements may comprise one of silicone rubber and nylon. Silicone rubber and nylon have been found to have the required resilience in order to be inserted into the correct location with the force than can be provided using existing boroscopes, but also the required stiffness to be able to maintain the inspection element in the correct position and orientation once deployed.

The inspection element may have a diameter from a distal end of a resilient element to a distal end of a radially oppositely disposed resilient element greater than an internal width of an observation location, and may have a diameter of approximately 6 mm.

The radially extending resilient elements may be circumferentially distributed. The inspection element may comprise a principal axis, and the radially extending resilient elements may be distributed along the principal axis.

The inspection element may comprise a row of circumferentially distributed resilient elements, and may comprise a plurality of rows of resilient elements distributed along the principal axis.

By providing the resilient elements in one or more rows of circumferentially distributed resilient elements, the inspection element can be maintained at substantially any rotational orientation relative to the principal axis by engagement with the internal surface of the cavity at the observation location. By providing a plurality of rows of resilient elements, distributed along the principal axis, the resilient elements can be maintained in an orientation about the principal axis of the inspection element.

The inspection element may comprise a camera and may include a lighting element. The inspection element may have a wireless link which may comprise a radio transmitter and/or radio receiver and/or transceiver. The inspection element may include a temperature sensor. The inspection element may include a pH or chemical element sensor.

DETAILED DESCRIPTION

Figure 1:
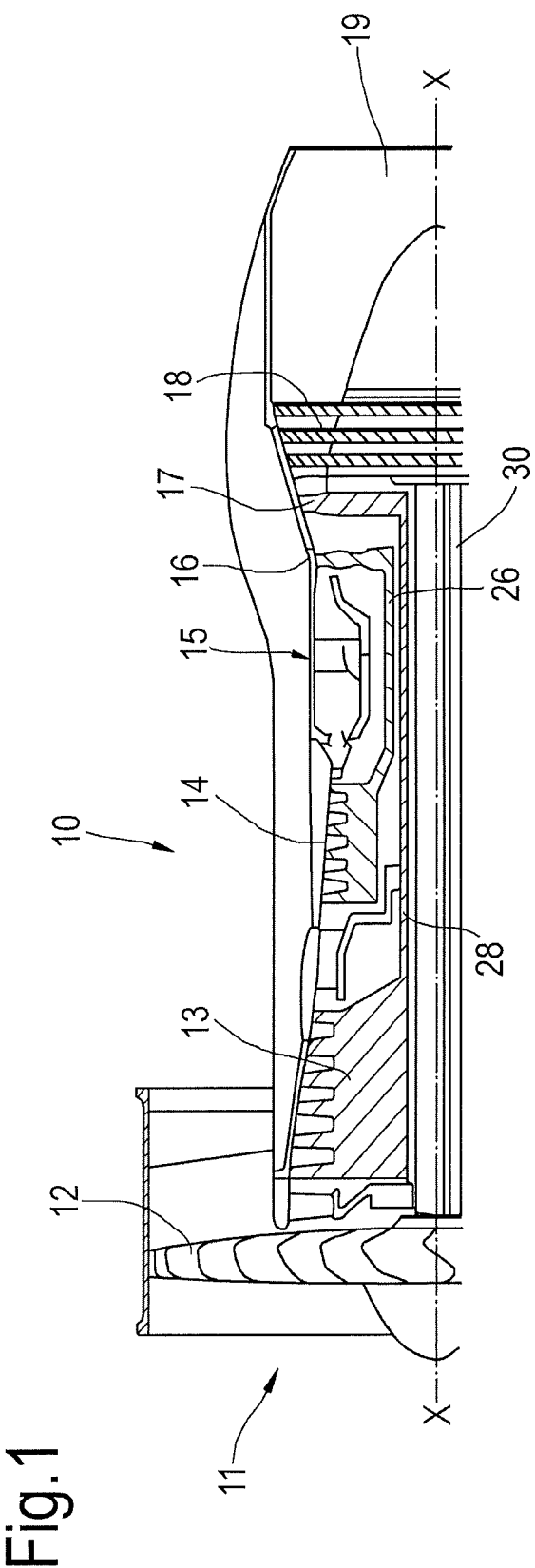
FIG. 1 is a schematic illustration of a gas turbine engine

FIG. 1 shows a gas turbine engine 10 having, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

In service, it is often necessary to inspect internal components of the gas turbine engine 10. If a defect is found, it may also be desirable to conduct repairs of the internal components without first disassembling the engine 10. Such repair operations are known as "bore blending".

Figure 2:
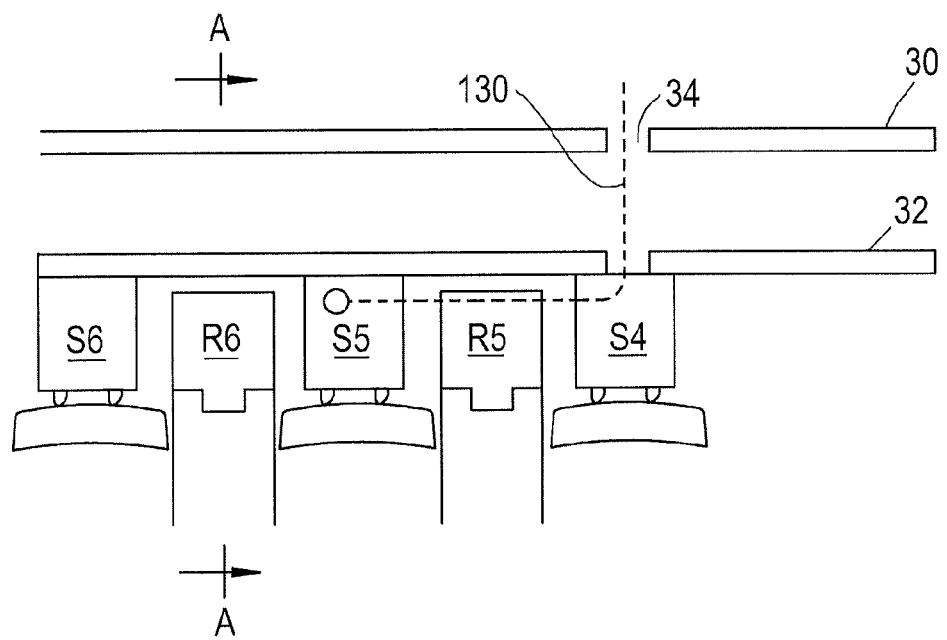
FIG. 2 is a schematic cross sectional side view through part of the gas turbine engine of FIG. 1.

In one known gas turbine engine 10, of particular concern are parts of the high pressure compressor 14. A cross sectional side view of part of the high pressure compressor 14 of the gas turbine engine 10 is shown in FIG. 2. The high pressure compressor 14 is contained within a housing comprising outer 30 and inner 32 cases. Both the outer and inner cases 30, 32 include an inspection port 34 through which an inspection arrangement 130 (described in further detail below) can be inserted into the interior of the inner case 32 and manoeuvred to an observation location. The inspection port 34 comprises an aperture having a sufficient diameter for the inspection arrangement 130 to be inserted, and can be sealed off when not in use to allow the compressor to operate.

Figure 3:
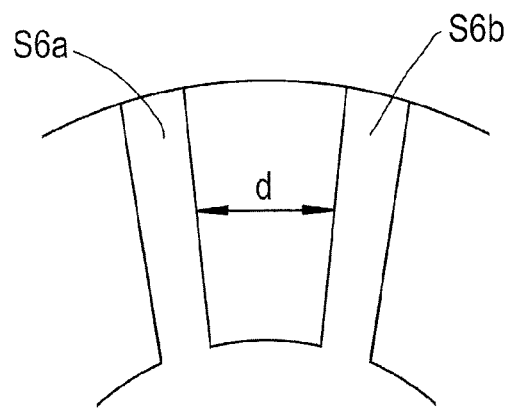
FIG. 3 is a schematic cross section front view of the part of the gas turbine of FIG. 2 through the line A-A.

The high pressure compressor 14 comprises an alternating series of rows of stationary in use stators (generally indicated in FIG. 2 by S4 to S6) and rotating in use rotors (generally indicated in FIG. 2 by R5 and R6). Each row of stators and rotors comprises a plurality of circumferentially arranged blades, such as blades S6a, S6b shown in FIG. 3. A gap d is provided between adjacent stator blades in each row. A similar size gap is provided between adjacent rotors in each row.

In most gas turbine engines, inspection ports are located in several locations. However, it is generally not possible to provide an inspection port adjacent each component to be inspected, particularly in areas such as the high pressure compressor 14. In the example shown in FIG. 2, the inspection port 34 is provided adjacent the fourth stator stage S4. Access to other components of the high pressure compressor 14 through the inspection port 34 must be gained by manoeuvring the inspection arrangement 130 between adjacent rows of stator and rotors blades. However, there is often no direct line of sight between the inspection port 34 and the desired observation location. It may therefore be necessary to withdraw the inspection arrangement 130, move the rotor to a new position, and reinsert the inspection arrangement 130 to inspect a further rotor blade. In the example shown, a particularly difficult area to inspect through the inspection port 34 is the sixth high pressure rotor and stator stages R6, S6.

Figure 4:
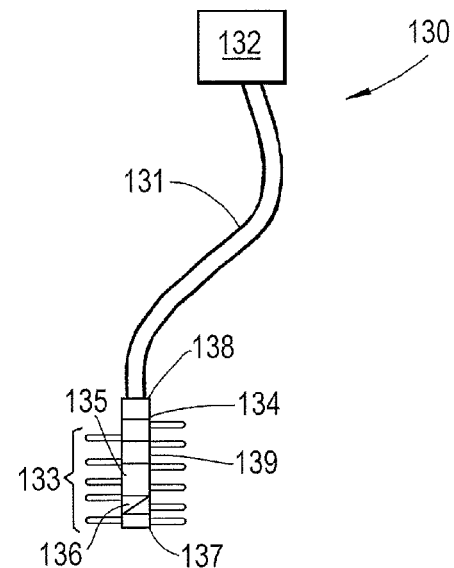
FIG. 4 is a schematic illustration of an inspection arrangement in accordance with the present invention.

FIG. 4 shows the inspection arrangement 130 in more detail. The inspection arrangement 130 comprises a positioning tool 131 having controller elements 132 at a proximal in use end and an inspection element 133 at a distal in use end. The positioning tool 131 as illustrated comprises an elongate cable which can be twisted and bent to allow manoeuvring through a positioning path within an assembly such as the gas turbine engine 10.

The controller elements 132 generally incorporate appropriate external controls for release, as indicated through a release element 134, of the inspection element 133 in use. It will also be understood that the controller elements 132 may incorporate a radio transmitter to relay images to a base station or a remote location for appropriate viewing or processing.

The inspection element 133 in accordance with aspects of the present invention comprises a number of features. Firstly, an inspection sensor 135 typically in the form of a camera will be provided. Alternatively or additionally, temperature sensors or PH or chemical sensors could be provided in. The inspection element 133 in the embodiment depicted includes angled mirrors or beam splitters or lenses 136 to enable the viewed area of the camera to be adjusted. It will be understood that a fixing element shown schematically as element 137 will be associated with the inspection element 133. The fixing element 137 is arranged to fix the inspection element 133 in a desired position and orientation once manoeuvred and deployed in the observation location, and is described in further detail below.

The inspection arrangement 130 further comprises an attachment arrangement for selectively attaching or releasing the inspection element 133 to the positioning tool 131. In this example, the attachment arrangement comprises a permanent magnet 134 attached to the inspection element 133, and an electromagnet 138 attached to the positioning tool 131. The electromagnet 138 can be turned on and off using the controller elements 132. When the electromagnet is turned on, the permanent magnet 134 is attracted to the electromagnet 138. The inspection element 133 is thus attached to the positioning tool 131. When the electromagnet is turned off, the inspection element 133 is released from the positioning tool 131.

Figure 5:
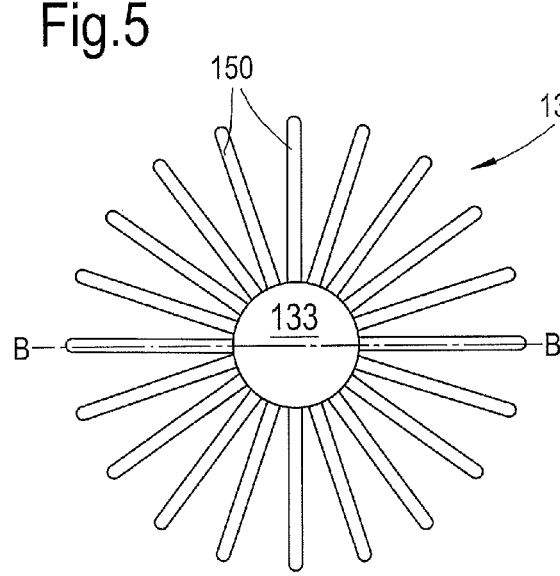
FIG. 5 is a plan cross sectional illustration of part of the inspection arrangement of FIG. 4 in a fully extended position.
Figure 6:
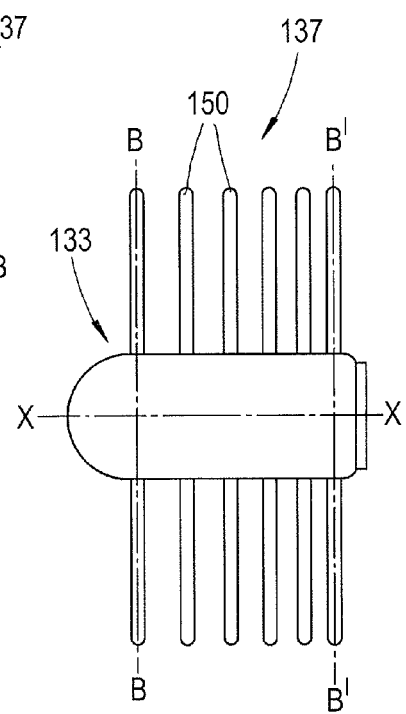
FIG. 6 is a transverse cross sectional illustration of the part of the inspection arrangement of FIG. 4 through the line B-B in the fully extended position.
Figure 7:
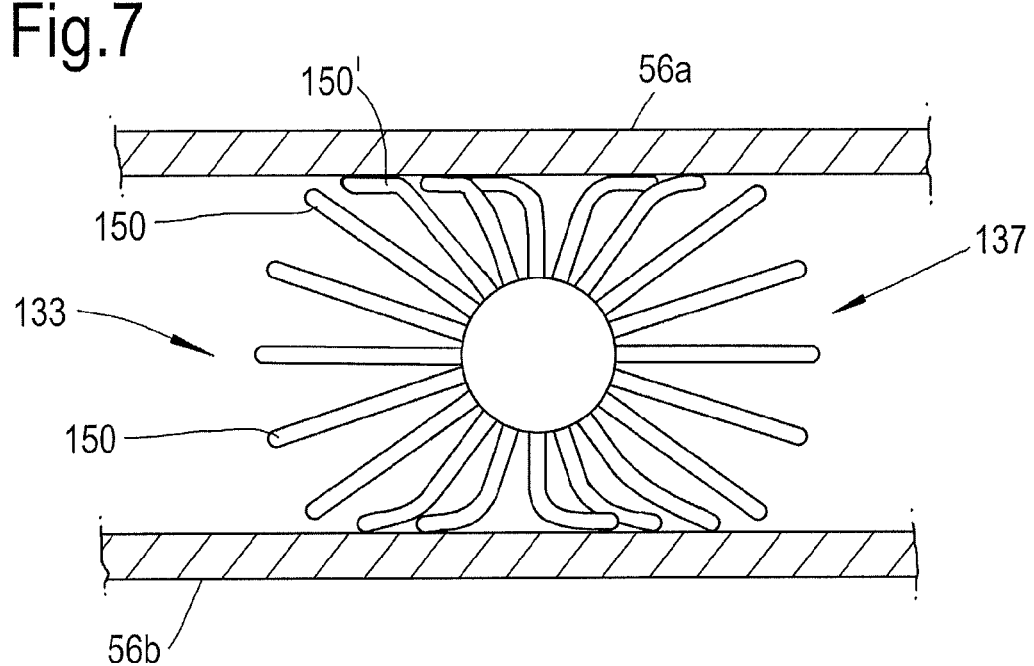
FIG. 7 is a transverse cross sectional illustration of the part of the inspection arrangement of FIG. 4 in a deployed position within the part of the gas turbine shown in FIG. 2.
Figure 8:
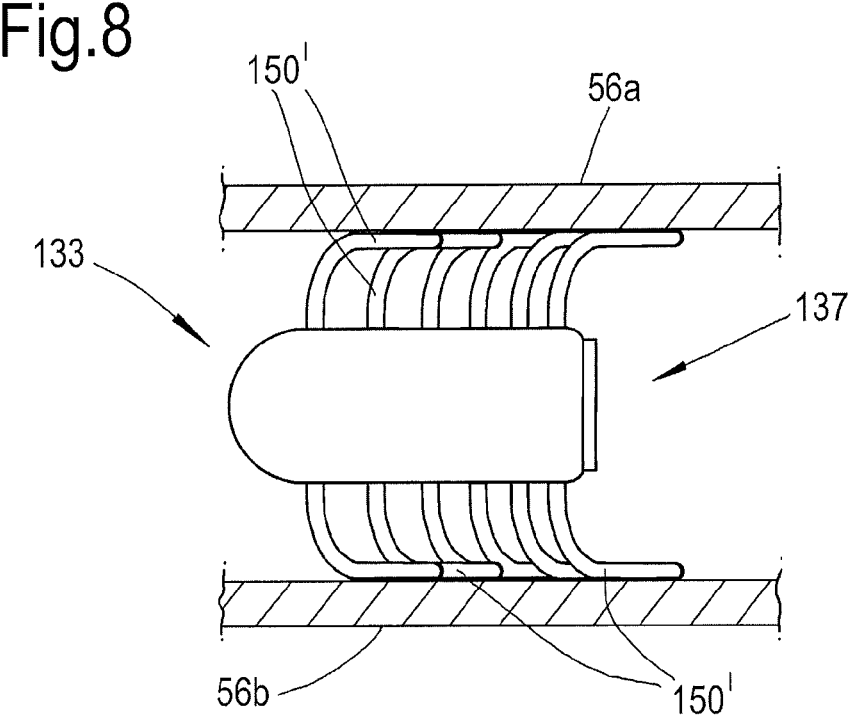
FIG. 8 is a plan cross sectional illustration of the part of the inspection arrangement of FIG. 4 in a deployed position within the part of the gas turbine shown in FIG. 2.

The inspection element 133 and fixing element 137 are shown in further detail in FIGS. 5 and 6. The fixing element 137 comprises a plurality of resiliently flexible members 150. Each resiliently flexible member 150 comprises a suitably flexible material such as nylon or silicone rubber, though other resiliently flexible materials may be used. Each resiliently flexible member 150 has a length extending radially outwardly from an outer surface of the inspection element 133 of approximately 6 mm. Consequently, each resilient member 150 is configured to be displaceable from a fully extended position (as shown in FIGS. 5 and 6) to a bent position (as shown in FIGS. 7 and 8) by applying a force to the end of the respective element 150. When in the fully extended position, each of the resiliently flexible member 150 extends in a respective radial plane B-B, B-B' etc. However, when in the bent position, each resiliently flexible member extends at an angle to the radial plane. Since each element 150 is resiliently flexible, it will automatically return to the fully extended position from the bent position when the force is released.

As shown in FIG. 6, the resilient flexible members 150 are arranged in a plurality of spaced rows arranged along a principal axis X of the inspection element 133. The resilient flexible members 150 in each row are arranged circumferentially around the inspection element 133 extending radially outwardly, with gaps being provided between adjacent flexible members 150, as shown in FIG. 5.

In use, the positioning tool 130 with the inspection element 131 attached is inserted through an appropriate access port in an assembly to be inspected such as the gas turbine engine 10. For example the areas to be expected may be a rotor and in such circumstances the access port will be chosen to be in close proximity to that rotor. The positioning tool 130 is manipulated from the proximal end until the inspection element 133 is located in a first inspection location.

FIGS. 7 and 8 show cross sectional views similar to those of FIGS. 5 and 6, but with the inspection element 137 located in a first inspection location between two adjacent compressor stators S6a, S6b of the gas turbine engine 10. Since the distance d between the adjacent stators S6a, S6b is less than the total width of the inspection element 133 with the resiliently flexible elements 150 in the extended position, some of the flexible elements 150 will be moved to the bent position when moved to the inspection location. For example, flexible element 150[1] is bent by contact with stator S6a. In general, one or more resiliently flexible members 150[1] from several rows of flexible members 150 will contact one of the stators S6, and be moved to the bent position against the respective stator. Consequently, the inspection element 133 will be held in position, both in terms of its position relative to the stators S6, and its orientation.

Once located in the first inspection location, the inspection element 133 can be detached from the cable 131 using a suitable release mechanism. In one example, the release mechanism comprises an electro magnet. Once released, the cable 131 is withdrawn, and the high pressure shaft 26 is slowly rotated such that the each of the rotors R6 can be viewed by the inspection element 133 from the inspection location. Once each of the rotors R6 have been viewed, the cable 131 is reinserted to the inspection location, and the inspection element 133 is reattached to the cable 131 and withdrawn through the inspection port 34.

Similarly, the inspection element 133 could be inserted into a gap between adjacent rotor stages, say stage R5. The inspection element 133 would then be detached from the cable 131, and the shaft 26 rotated such that each of the stators S5 could be viewed. In this manner, substantially any individual rotor or stator blade in the engine 10 can be inspected from the available inspection ports.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the inspection element could alternatively or in addition comprise other types of sensors. The inspection element could be attached and released from the positioning tool using a different means.

The invention claimed is:

1. An inspection arrangement comprising an inspection element and a positioning tool for positioning the inspection element, the inspection element being attachable to the positioning tool by an attachment arrangement, and having a fixing element to present the inspection element in use, the fixing element comprising a plurality of radially extending resilient elements, wherein the inspection arrangement further comprises a controller element at a proximal in use end of the inspection arrangement configured to control release of the inspection element from the positioning tool, the controller element having a radio transmitter.

2. An arrangement according to claim 1, wherein each of the radially extending resilient elements comprises one of silicone rubber and nylon.

3. An arrangement according to claim 2, wherein the radially extending resilient elements are circumferentially distributed.

4. An arrangement according to claim 1, wherein the inspection element has a diameter from a distal end of a resilient element to a distal end of a radially oppositely disposed resilient element greater than an internal width of an observation location.

5. An arrangement according to claim 4, wherein the radially extending resilient elements are circumferentially distributed.

6. An arrangement according to claim 4, wherein the inspection element has a diameter of approximately 6 mm.

7. An arrangement according to claim 6, wherein the radially extending resilient elements are circumferentially distributed.

8. An arrangement according to claim 1, wherein the radially extending resilient elements are circumferentially distributed.

9. An arrangement according to claim 1, wherein the inspection element comprises a principal axis, and the radially extending resilient elements are distributed along the principal axis.

10. An arrangement according to claim 9, wherein the inspection element comprises a plurality of rows of resilient elements distributed along the principal axis.

11. An arrangement according to claim 1, wherein the inspection element comprises a camera.

12. An arrangement according to claim 1, wherein the inspection element has a wireless link.

* * * * *